United States Patent [19]

Takizawa et al.

[11] Patent Number: 5,770,245
[45] Date of Patent: Jun. 23, 1998

[54] PREPLASTICIZING INJECTION MACHINE

[75] Inventors: Kiyoto Takizawa; Toshimi Kato, both of Hanishina-gun, Japan

[73] Assignee: Nissei Plastic Industrial Co., Ltd., Nagano-ken, Japan

[21] Appl. No.: 718,627

[22] Filed: Sep. 17, 1996

[30] Foreign Application Priority Data

Sep. 18, 1995 [JP] Japan .................................. 7-262033

[51] Int. Cl.[6] .................................................. B29C 45/54
[52] U.S. Cl. .................... 425/549; 264/328.19; 425/557; 425/587; 425/812
[58] Field of Search ................................. 425/585, 586, 425/587, 203, 557, 558, 559, 561, 812, 549; 264/328.17, 328.19, 331.17

[56] References Cited

U.S. PATENT DOCUMENTS

| | | | |
|---|---|---|---|
| 3,263,276 | 8/1966 | Maier | 425/587 |
| 3,481,001 | 12/1969 | Stillhard | 425/587 |
| 4,390,332 | 6/1983 | Hendry | 264/328.19 |
| 4,749,536 | 6/1988 | Farrell | 264/328.19 |
| 4,946,356 | 8/1990 | Kumazaki | 425/587 |
| 5,030,080 | 7/1991 | Fukuda et al. | 425/587 |
| 5,253,994 | 10/1993 | Zweig et al. | 425/587 |
| 5,364,255 | 11/1994 | Yokoyama | 425/587 |
| 5,380,187 | 1/1995 | Fujikawa | 425/587 |

*Primary Examiner*—Jay H. Woo
*Assistant Examiner*—Joseph Leyson
*Attorney, Agent, or Firm*—Weingarten, Schurgin, Gagnebin & Hayes LLP

[57] ABSTRACT

There is provided a preplasticizing injection machine including a resin vent formed in the injection cylinder behind the plunger stroke wherein said resin vent is connected to a pressure reducing device and/or an inert gas feeding machine. The resin entrapped in the clearance prevents gases generated within the cylinder from being exhausted and it may be blackened due to the oxidation thereof. According to the present invention, these problems can be solved by the above construction. Furthermore, a band heater is provided on the outer surface of the cylinder behind the injection plunger stroke over the resin vent to prevent the entrapped resin from being solidified.

6 Claims, 2 Drawing Sheets

PREPLASTICIZING INJECTION MACHINE

BACKGROUND OF THE INVENTION

1. Field of the Invention

The present invention relates to a preplasticizing injection machine in which separate cylinders are used for plasticization and injection of a feed resin.

2. Background Art

Typical preplasticizing injection machines comprise two separate cylinders, i.e., an injection cylinder and a plasticizing cylinder. The injection cylinder has an injection plunger passed therethrough. Likewise, the plasticizing cylinder has a screw or a plunger for plasticization passed therethrough. The plasticizing cylinder is for softening and kneading a resin to make it plastic (hereinafter, referred to as plasticization). The plasticizing cylinder is connected at the end thereof to an end of the injection cylinder through, for example, a tube which serves as a passage for resins. The plasticized resin is thus fed to the injection cylinder through the tube. The plasticized resin is weighed at a front portion of the injection cylinder and is injected as the injection plunger advances.

The plunger is passed through the injection cylinder and slides therein. There is a clearance between the inner surface of the injection cylinder and the outer surface of the plunger to allow smooth sliding of the plunger. The clearance has such a depth that avoids undesired entrance of the molten resin. The molten resin may, however, flow into the clearance during the repeated cycle of weighing and injection of the molten resin. Should it happen, the resin sometimes causes an adverse effect on the sliding motion of the plunger. More specifically, it is expected that no significant problem arises inasmuch as the resin entrapped in the clearance is in a molten state and merely forming a thin coating of the resin between the injection cylinder and the plunger. However, the sliding motion of the plunger is adversely affected when the clearance is filled with the molten resin or when the resin is solidified. In such an event, a sliding resistance is increased to cause pressure loss. In addition, misalignment may occur between the injection cylinder and the plunger.

As measures to the above mentioned problem of the entrapped resin in the clearance, a resin vent may be formed in the injection cylinder at a rear portion thereof to allow the entrapped resin to escape out of the clearance. This approach is practical only when the resin is heated and has some fluidability. The resin vent is not a help to the removal of the entrapped resin if it is solidified.

Furthermore, when the entrapped resin is solidified, gases generated within the cylinder can not be exhausted and/or blackening (carbonation) of the entrapped resin occurs due to the oxidation of the resin in the clearance.

The present invention is directed to overcome the above mentioned problem of the entrapped resin in the clearance and an object thereof is to provide a novel preplasticizing injection machine of the type described in which the resin vent is also used as a ventilation hole and/or a gas introduction passage for an inert gas to allow removal of the gas generated in the injection cylinder and to avoid oxidation.

Another object of the present invention is to provide a novel preplasticizing injection machine in which the resin entered the clearance is kept to be in the molten state until it reaches the resin vent formed in the injection cylinder behind the plunger stroke to avoid possible increase in sliding resistance which otherwise is caused due to the solidification of the entrapped resin.

SUMMARY OF THE INVENTION

According to the present invention, there is provided a preplasticizing injection machine comprising: an injection cylinder having a plunger passed therethrough; a plasticizing cylinder provided in parallel with the injection cylinder; a resin passage connected to the injection cylinder at one end and the plasticizing cylinder at the other end to allow resin communication between the injection cylinder and the plasticizing cylinder, the resin passage being extended between an inflow port and an outflow port, the inflow port being formed in the injection cylinder at a portion corresponding to the advance limit of the plunger and the outflow port being formed in the plasticizing cylinder at an end thereof; and a resin vent formed in the injection cylinder at a portion behind a plunger stroke of the plunger; wherein the resin vent is connected to a pressure reducing device for use in sucking a gas generated in the injection cylinder to exhaust the gas out of the injection cylinder and/or to an inert gas feeding machine to feed an inert gas to the injection cylinder to avoid oxidation of a resin in the injection cylinder.

The injection cylinder with the plunger therethrough has a heater or heaters on the outer surface thereof. The heater is for heating a portion of the injection cylinder that typically corresponds to the plunger stroke. In a conventional type machine, no heater is provided for a backward portion. A temperature of the injection cylinder is thus lowered from the rear portion thereof. This is also true for the plunger. The molten resin is thus cooled and solidified when it is forced to the back of the plunger stroke. Such a solidified resin cannot be removed through the resin vent.

According to the present invention, there is provided a preplasticizing injection machine as described before, wherein a band heater is further provided on the outer surface of the injection cylinder at a portion in front of and behind the resin vent to define a heater zone longer than the plunger stroke.

With the above mentioned structure, the resin in the clearance is kept to be in the molten state even at the portion of the resin vent. The resin is flown out of the cylinder through the resin vent without being solidified. As a result, the injection cylinder becomes free of the excessive concentration or solidification of the resin in the clearance, which contributes to prevent increase of the sliding resistance and pressure loss. In addition, any gases generated in the injection cylinder is positively evacuated out of the cylinder through the clearance by means of suction under reduced pressure. Any defective molding due to the generated gas can thus be avoided. Furthermore, the resin vent may be used to introduce an inert gas such as a nitrogen gas into the injection cylinder to prevent the resin in the clearance from being blackened (carbonized) due to oxidation. This eliminates molding contaminated with a carbonized resin.

DETAILED DESCRIPTION OF THE PREFERRED EMBODIMENTS

Figure 1:
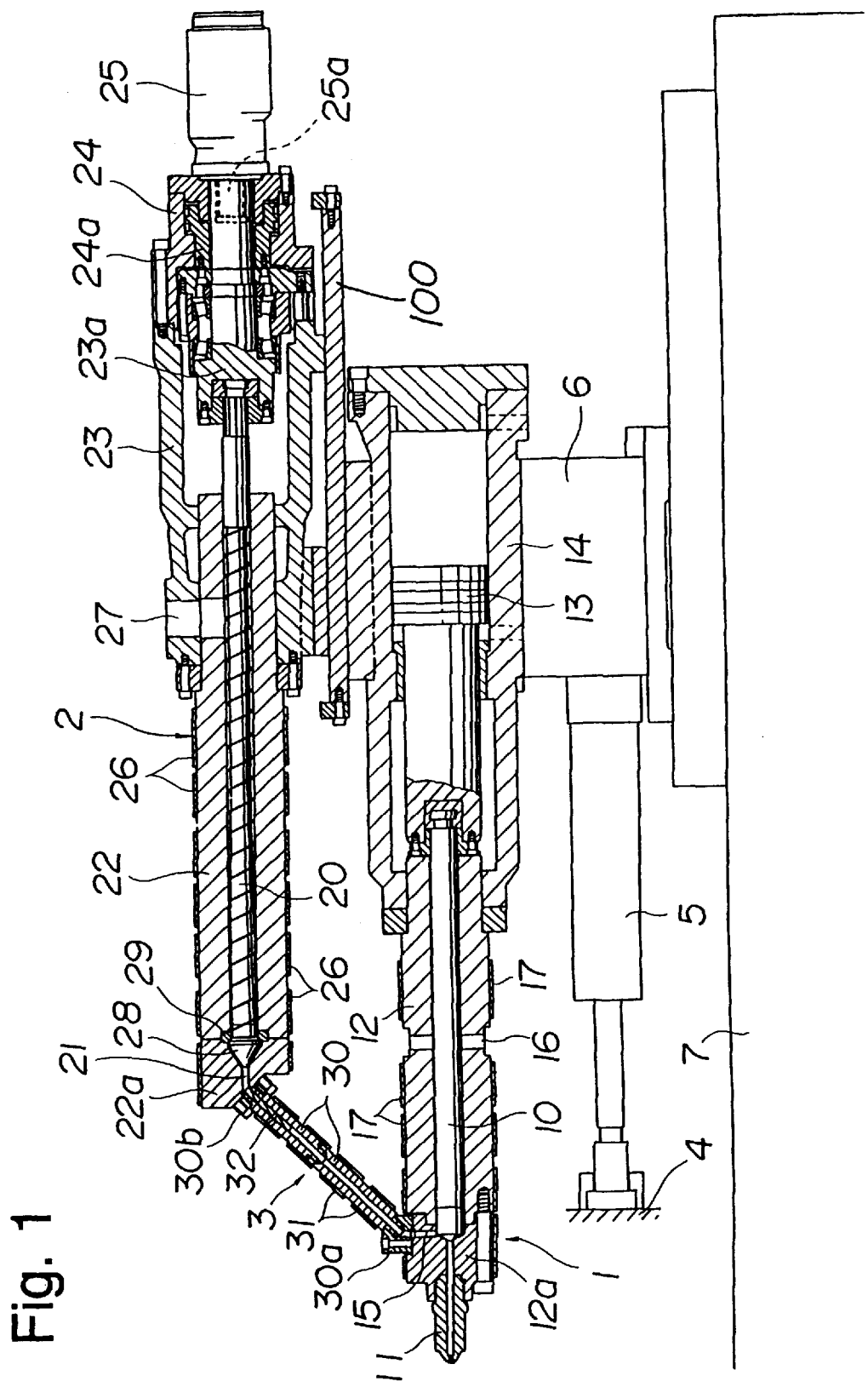
FIG. 1 is a cross sectional view of a preplasticizing injection machine according to an embodiment of the present invention.

Referring to FIG. 1, an injection machine 1 is placed in parallel with a plasticizing machine 2. The injection machine 1 is communicated with the plasticizing machine 2 through a resin passage 3. The injection machine 1 comprises an injection cylinder 12 and a hydraulic cylinder 14 for injection. The injection cylinder 12 comprises an injection plunger 10 passed therethrough. More specifically, the injection plunger 10 is slidably placed in the injection cylinder 12. The injection cylinder 12 also comprises a nozzle 11 at the end thereof. The hydraulic cylinder 14 is connected to the injection cylinder 12 at the rear end thereof. The hydraulic cylinder 14 comprises a piston 13 passed therethrough. The piston 13 is coupled to the injection plunger 10. Though not illustrated in the figure, the injection plunger 10 is slightly away from the inner surface of the injection cylinder 12 to form a clearance therebetween to allow the sliding motion of the plunger 10. The clearance may be, for example, 0.005~0.01mm.

The injection cylinder 12 has an inflow passage 15 formed therein at the portion corresponding to the advanced limit of the plunger 10. The inflow passage 15 is communicated with the resin passage 3 and is cant towards an inner periphery 12a of the injection cylinder 12 to allow a plasticized resin from the resin passage 3 to flow along the inner surface of the injection cylinder 12.

Figure 2:
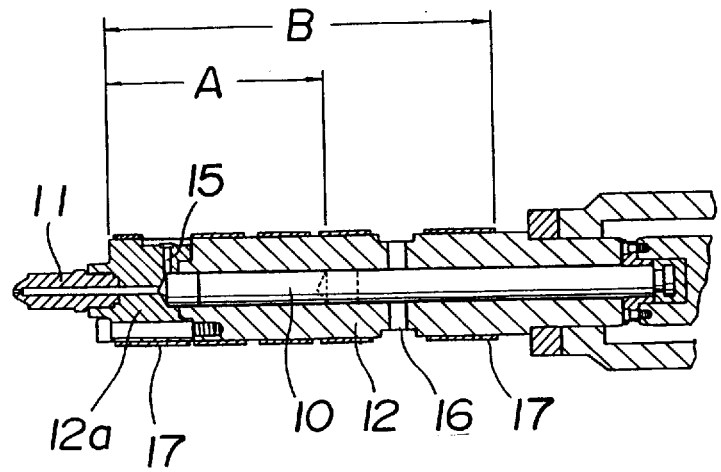
FIG. 2 is a vertical cross sectional view illustrating essentials of an injection cylinder with a plunger stroke and a heat zone.
Figure 3:
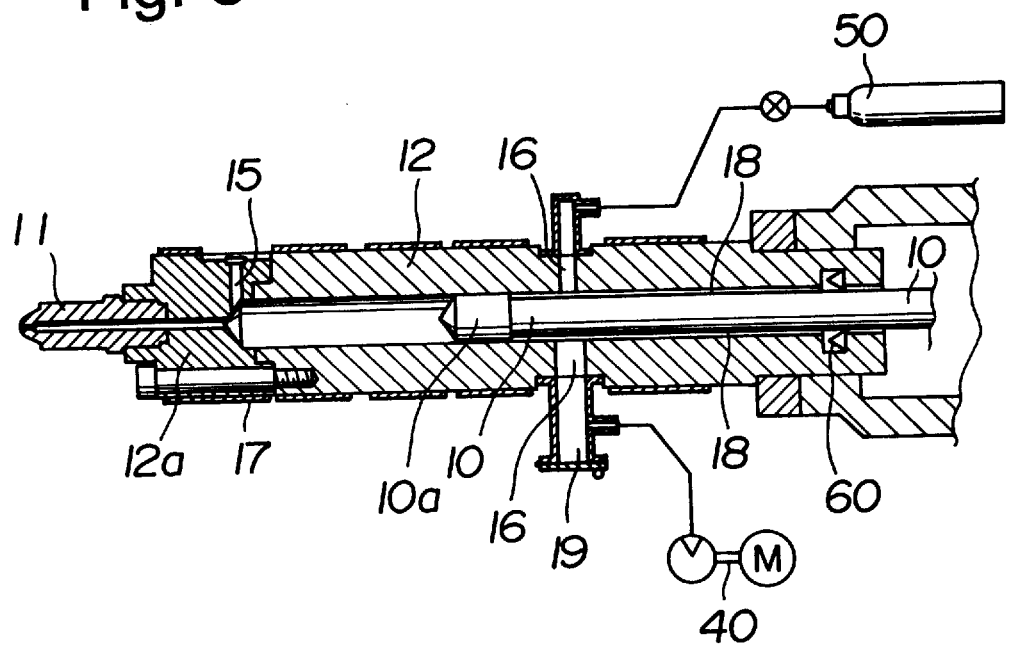
FIG. 3 is a vertical cross sectional view illustrating essentials of an injection cylinder according to another embodiment of the present invention.

Resin vents 16 are formed in the injection cylinder 12 at upper and lower portions behind the plunger stroke A of the injection cylinder 12. The resin vents 16 are for allowing the resin entrapped in the clearance to escape out of it. Band heaters 17 are provided on the outer surface of the injection cylinder 12 at positions corresponding to the plunger stroke as well as to where behind the resin vents 16. As shown in FIG. 2, the heater zone B is longer than the plunger stroke A. The injection cylinder 12 is thus kept to a higher temperature than in the conventional cases where the heater zone B is substantially equal in length to the plunger stroke A.

The injection plunger 10 is not limited to the illustrated one having the same diameter in the axial direction. Instead, the plunger stroke may be formed of a plunger head 10a and a remaining length of the plunger or a shaft which is smaller in diameter than the plunger head 10a. The resin entrapped in the small clearance around the plunger head is forced to the larger clearance 18 around the shaft during the advancing motion of the injection plunger 10. The resin in the clearance 18 is then forced toward the upper and lower resin vents 16 by means of the screw head 10a as it moves backward.

The enlargement of the clearance 18 around the shaft contributes to exhaust gases (decomposed gas and water vapor) generated from the molten resin in the injection cylinder 12. The generated gas is forced to be exhausted out of the injection cylinder 12 through the resin vent 16 by means of a pressure reducing device 40 connected to the resin vent 16. The pressure reducing device 40 may be a motor-driven vacuum pump generally used for vent-type molding machines.

The resin vent 16 may also be connected to an inert gas feeding machine 50 to fill the clearance 18 with the inert gas. The inert gas feeding machine 50 may be a gas cylinder with a valve. The inert gas filled in the clearance serves to avoid oxidation of the resin therein.

For the connection of the pressure reducing device 40 or the inert gas feeding machine 50 to the resin vent 16, a gap at the rear end of the injection cylinder 12 is sealed with a gasket 60 to provide air-tight sealing therebetween. The joint between the resin vent 16 and the pressure reducing device 40 (or the inert gas feeding machine 50) is also sealed in an air-tight manner. The air-tight sealing of the resin vents 16 may cause some troubles in exhausting the molten resin. With this respect, the lower resin vent 16 is connected with a cylindrical resin trap 19. The resin trap 19 has a bottom aperture to which a lid attached in an air-tight manner. The resin trap 19 is for collecting the molten resin flown from the clearance 18 through the resin vent 16.

In the illustrated embodiment, the pressure reducing device 40 and the inert gas feeding machine 50 are communicated with the upper and lower resin vents 16, respectively. However, they may be connected to the resin trap 19. Alternatively, either one of the pressure reducing device 40 and the inert gas feeding machine 50 may be connected to the resin vent 16 to assure forced elimination of the gas out of the clearance or to prevent possible oxidation. In order to achieve both the suction under reduced pressure and prevention of oxidation, the gas in the clearance may be sucked out during the backward movement of the injection plunger 10 while the feeding of the inert gas is stopped. The prevention of carbonization may be achieved by means of feeding the inert gas during the forward movement of the injection plunger while the suction under reduced pressure is stopped.

The above mentioned plasticizing machine 2 comprises a plasticizing cylinder 22, a holding cylinder 23, a hydraulic cylinder 24, and a rotary driving device 25. The plasticizing cylinder 22 has a plasticizing screw 20 rotatably mounted therein. The plasticizing cylinder 22 also has an outflow passage 21 at the end thereof. The holding cylinder 23 is located at the rear portion of the plasticizing machine 2 for holding the plasticizing cylinder 22. The hydraulic cylinder 24 is for use in advancing and retracting a screw coupled to the holding cylinder 23 at the rear end of it. The rotary driving device 25 is for a screw 20 attached to the hydraulic cylinder at the rear end of it.

A drive shaft 25a of the rotary driving device 25 is coupled to a rotary shaft 23a. A rear portion of the rotary shaft 23a is passed through a piston 24a of the hydraulic cylinder 24. The rotary shaft 23a is supported in the holding cylinder 23 to allow free rotation thereof in the axial direction. The rotary shaft 23a is connected at the end thereof to the screw 20 at the rear end thereof. In addition, the rotary shaft 23a is coupled to the piston 24a and is moved forward and backward in synchronism with the piston 24a to advance and withdraw the latter.

Band heaters 26 are provided on the outer surface of the plasticizing cylinder 22. A feeding port 27 is formed in the plasticizing cylinder 22 at a rear portion close to the rear end thereof engaged with the holding cylinder 23. The feeding port 27 is faced upward as shown in FIG. 1. The screw 20 has a mushroom valve 28 attached at the end thereof. The mushroom valve 28 is positioned at the end of the plasticizing cylinder 22 where a conical gap is formed. The conical gap from the valve 28 serves to form a desired passage communicated with the outflow port 21. The mushroom valve 28 has an inclined back surface facing with a circular valve seat 29.

The resin passage 3 is formed of a small tube 30 provided with band heaters 31 on the outer surface thereof. The resin passage 3 comprises a predetermined mixing member 32 therein. The small tube 30 is connected to the injection machine 1 and the plasticizing machine 2 through joints 30a and 30b, respectively, to connect the inflow passage 15 with the outflow passage 21. As shown in the figure, the small tube 30 is canted with respect to the machines.

The injection machine 1 and the plasticizing machine 2 are integrally formed with each other in a row with the holding cylinder 23 being mounted on a support plate 100 provided over the hydraulic cylinder 14. The hydraulic cylinder 14 of the injection machine 1 is mounted on a base block 6 which in turn is mounted on a base 7. The base block 6 is slidably connected to a fixing plate 4 of a clamping device through a nozzle touch cylinder 5.

With the above mentioned structure, a resin is fed to the plasticizing cylinder 22 through the feeding port 27. The resin is plasticized because of the heat generated by the band heaters and of rotation of the screw 20. The plasticized resin is forced to the forward to apply a pressure in the forward direction to the screw 20. As a result, a gap is formed between the valve body 28 and the valve seat 29 for the passage of the resin. The plasticized resin is thus forced to the resin passage 3.

The plasticized resin is repeatedly granulated and mixed by means of the mixing member 32. The resin may further be plasticized or colored while it is flown toward the inflow passage 15. The resin flows into the injection cylinder 12 through the inclined inflow passage 15. The incoming resin is reserved in the cylinder while pushing the tip of the plunger 10 to force the plunger 10 to the backward. The resin is allowed to flow into the cylinder until the plunger 10 reaches a predetermined retracted position.

When the plunger 10 reaches that position, the hydraulic cylinder 24 is moved backward to force the screw 20 to the backward. In response to this, the valve body 28 is abutted to the valve seat 29. This provides closure of the nose of the plasticizing cylinder 22 at the head unit 22a to stop the feeding of the plasticized resin. As a result, a predetermined amount of the resin is stored in the injection cylinder 12 in front of the plunger 10. Such process is typically referred to as weighing. The weighed resin is then injected out of the machine.

When the plunger 10 is advanced with the valve body 28 closed, the resin in the injection cylinder 12 is injected into a mold (not shown) through the nozzle 11. The injection pressure caused by the plunger 10 acts on the plasticizing cylinder through the resin remaining in the resin passage 3. However, any reverse flow of the resin to the plasticizing cylinder can be avoided because the valve body 28 is in the closed state. The total amount of the weighed resin is thus injected out of the cylinder through the nozzle 11.

The hydraulic cylinder 14 is moved forward to advance the screw 20 at a predetermined distance when the injection process is completed. This separates the valve body 28 from the valve seat 29 to form a passage between the gap facing the front surface of the valve body 28 and the passage gap. The plasticized resin is pressurized into the injection machine through the resin passage to return the process to the weighing.

The forward and backward movement of the plunger for the weighing and the injection forces the resin in the clearance to the backward. This resin is not cooled to a solid because the heater zone B is longer than the plunger stroke A and the resin vents 16 are positioned behind the heater zone B. The resin in the clearance is in the molten state and can thus be discharged out of the cylinder through the resin vents 16. The gas in the clearance is also exhausted out through the resin vents 16.

While the present invention has thus been described in conjunction with the embodiment in which the plasticizing cylinder having the screw therein, it is understood that the present invention is not limited to a screw preplasticizing injection machine.

As described above, the present invention provides the resin vents in the cylinder wall at a portion behind the plunger stroke of the injection plunger and the band heaters are provided on the outer surface of the cylinder in the rear portion back from the resin vents. The heater zone is thus longer than the plunger stroke, which serves to keep the resin in the clearance to be in the molten state. Accordingly, it is possible to eliminate undesired increase of the sliding resistance and pressure loss which otherwise are caused due to the solidification of the resin.

Furthermore, the temperature of the injection cylinder at the weighing portion can be kept constant and the plunger itself is kept at a higher temperature than the conventional ones because the heater zone is longer than the plunger zone. The weighed resin thus has a constant temperature in the axial direction to enhance smooth flow of the resin out of the clearance. This prevents the resin from being concentrated or densified. Accordingly, there is less or no effects of the resin in the clearance on the sliding movement of the plunger. The misalignment of the injection cylinder can be avoided which otherwise may be caused.

The clearance is not sealed or clogged with the solidified resin, so that the gas in the clearance can be exhausted smoothly through the resin vents. The resin vents serve as the ventilation holes for the suction under reduced pressure to positively exhaust the decomposed gas or the like. Accordingly, it is possible to eliminate defective molding due to the generated gases.

Furthermore, the resin vents can be used for feeding the inert gas into the injection cylinder to avoid blackening (carbonization) due to the oxidation of the resin in the clearance. If the resin in the clearance flows into the weighed molten resin in the injection cylinder during the repeated movement of the injection plunger, the molten resin is not contaminated with a blackened resin. Accordingly, carbonized defective molding can be reduced to reduce losses of materials in changing the resin or color. It also reduces the time for such purposes.

What is claimed is:

1. A preplasticizing injection machine comprising:

an injection cylinder having a plunger passed therethrough;

a plasticizing cylinder having a valve seat at an end thereof provided in parallel with said injection cylinder;

a resin passage connected to said injection cylinder at one end and said plasticizing cylinder at the other end to allow selective resin communication between said injection cylinder and said plasticizing cylinder, the resin passage being extended between an inflow port and an outflow port, the inflow port being formed in said injection cylinder at a portion corresponding to the advance limit of the plunger and the outflow port being formed in said plasticizing cylinder through said valve seat; and a resin vent formed in said injection cylinder at a portion behind a plunger stroke of the plunger;

said resin vent disposed on a lower portion of said injection cylinder and in liquid and gaseous communication with said injection cylinder wherein a liquid flows naturally through said resin vent and wherein said resin vent is connected to a pressure reducing device for use in sucking a gas generated in said injection cylinder to exhaust the gas out of said injection cylinder.

2. A preplasticizing injection machine comprising:

an injection cylinder having a plunger passed therethrough;

a plasticizing cylinder having a valve seat at an end thereof provided in parallel with said injection cylinder;

a resin passage connected to said injection cylinder at one end and said plasticizing cylinder at the other end to allow selective resin communication between said injection cylinder and said plasticizing cylinder, the resin passage being extended between an inflow port and an outflow port, the inflow port being formed in said injection cylinder at a portion corresponding to the advance limit of the plunger and the outflow port being formed in said plasticizing cylinder through said valve seat; and a resin vent formed in said injection cylinder at a portion behind a plunger stroke of the plunger;

said resin vent disposed on a lower portion of said injection cylinder and in liquid and gaseous communication with said injection cylinder wherein a liquid flows naturally through said resin vent and wherein said resin vent is connected to an inert gas feeding machine to feed an inert gas to said injection cylinder to avoid oxidation of a resin in said injection cylinder.

3. A preplasticizing injection machine comprising:

an injection cylinder having a plunger passed therethrough;

a plasticizing cylinder having a valve seat at an end thereof provided in parallel with said injection cylinder;

a resin passage connected to said injection cylinder at one end and said plasticizing cylinder at the other end to allow selective resin communication between said injection cylinder and said plasticizing cylinder, the resin passage being extended between an inflow port and an outflow port, the inflow port being formed in said injection cylinder at a portion corresponding to the advance limit of the plunger and the outflow port being formed in said plasticizing cylinder through said valve seat; and a resin vent formed in said injection cylinder at a portion behind a plunger stroke of the plunger;

said resin vent disposed on a lower portion of said injection cylinder and in liquid and gaseous communication with said injection cylinder wherein a liquid flows naturally through said resin vent and wherein said resin vent is connected to both a pressure reducing device for use in sucking a gas generated in said injection cylinder to exhaust the gas out of said injection cylinder and an inert gas feeding machine to feed an inert gas to said injection cyliner to avoid oxidation of a resin in said injection cylinder.

4. A preplasticizing injection machine as claimed in claim 1, wherein a band heater is further provided on the outer surface of said injection cylinder at a portion in front of and behind said resin vent to define a heater zone longer than the plunger stroke.

5. A preplasticizing injection machine as claimed in claim 2, wherein a band heater is further provided on the outer surface of said injection cylinder at a portion in front of and behind said resin vent to define a heater zone longer than the plunger stroke.

6. A preplasticizing injection machine as claimed in claim 3, wherein a band heater is further provided on the outer surface of said injection cylinder at a portion in front of and behind said resin vent to define a heater zone longer than the plunger stroke.

* * * * *